Dec. 26, 1939.     N. CHAMPION     2,184,832
PHOTOGRAPH IDENTIFICATION
Filed Jan. 10, 1938
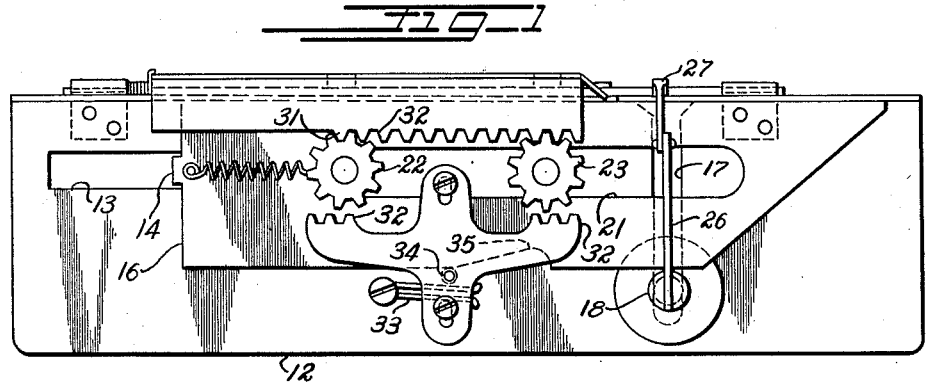
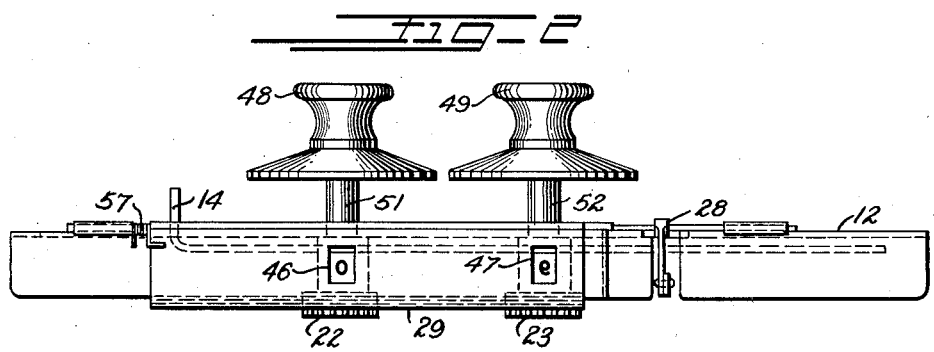
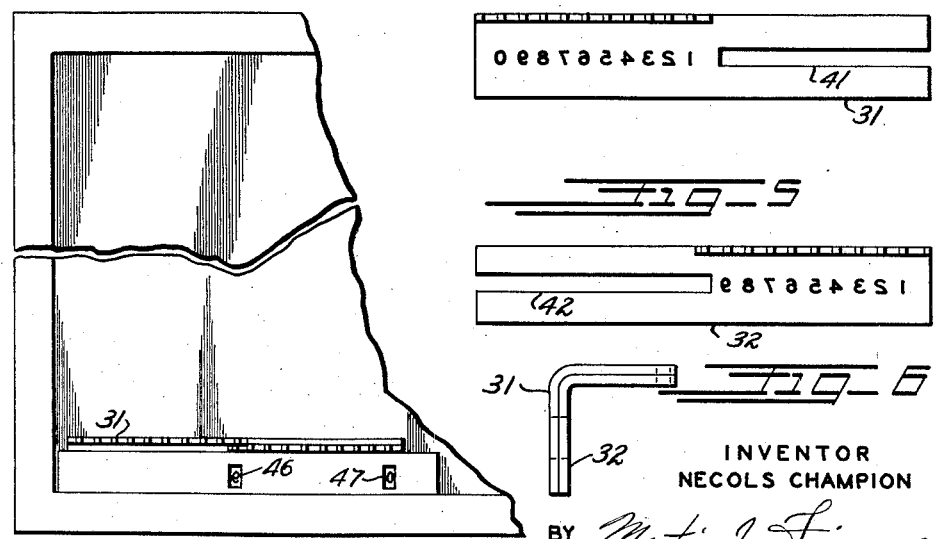
INVENTOR
NECOLS CHAMPION
BY Martin J. Finnegan
ATTORNEY Patented Dec. 26, 1939

2,184,832

UNITED STATES PATENT OFFICE 2,184,832

PHOTOGRAPH IDENTIFICATION

Necols Champion, Orange, N. J.

Application January 10, 1938, Serial No. 184,184

4 Claims. (Cl. 95—1.1)

This invention relates to photography, and particularly to the identification of photographs.

An object of the invention is to produce, in a system of the character disclosed in my Patent No. 2,105,521, granted on January 18, 1938, means for preventing an inadvertent change in the setting of the identification controlling mechanism after the insertion into the camera of the film or plate to be exposed, or at any time during exposure of the film or plate in the process of "taking the picture" and its subsequent removal from the camera.

Another object is to provide means for automatically locking the identification controlling, or "indexing mechanism" of my patent as the film or plate is inserted, and for automatically releasing the mechanism to permit a re-indexing thereof upon withdrawal of the film or plate.

In the accompanying drawing I have illustrated the invention as applied to a system of the form illustrated in my patent above identified; but it is to be understood that there is no intention to limit the scope of the invention in any respect other than as defined in the appended claims.

In the drawing:

Fig. 1 is a side elevation view of a device embodying the invention;

Fig. 2 is a plan view of the device;

Fig. 3 is a view of a portion of a conventional negative frame, or "plate holder", showing the sensitized glass plate mounted therein, on which an identifying number "90" has been imprinted by the action thereupon of the mechanism shown in Figs. 1 and 2;

Figs. 4 and 5 are elevation views of the stencil plates; and

Fig. 6 is an end view of the stencil plates.

In the drawing reference numeral 12 designates a mounting bracket, or apron, serving as a base for attachment of the complete assembly to the camera (not shown), said base 12 having a longitudinal slot 13, as in my aforesaid patent, to allow for rectilinear movement of an arm 14 projecting transversely from one end of a slide cam 16, as shown more fully in Figure 3 of my said patent. Base 12 also has a slot 17 along which the cross-head 18 of the hinged gate operating linkage 26, 27 is adapted to move whenever slide 16 is shifted to the left of the position shown. The slide 16 is also slotted, as shown at 21, to allow for a full stroke thereof without interference from the stencil rack actuating pinions 22 and 23, corresponding to the pinions similarly designated in my patent. Also as in my patent, the pinions 22 and 23 engage teeth formed on the edges of the stencil racks 31 and 32, respectively, to shift said racks step by step as successive pictures are taken, on successively inserted films or plates.

By providing means to hold the pinions 22 and 23 against rotation while a plate or film is in the picture taking position, any undesirable change in the setting of the stencil racks, hence any incorrect marking of the film or plate, as by recording a non-consecutive number thereon, will be avoided—and that is the purpose served by the means now to be described. As shown, such means takes the form of a two-armed clutch, or brake, 31 having teeth 32 engageable with both pinions, and adapted to be moved into and then held in mesh therewith by the pressure of spring 33 upon the projection 34 of the brake 31, when the movement of slide 16 has progressed far enough to bring the deep end of notch 35 opposite the said projection 34.

After exposure of the film or plate, its removal from the camera causes the return of slide 16 to the position shown, the return to said position being brought about by the means more fully shown and described in my prior patent, or by some suitable equivalent thereof. Such return of the slide to the right exerts a pressure upon projection 34 which causes a disengagement of the brake and a return thereof to the position shown. The pinions may now be rotated to bring the next consecutive numerical (or equivalent) designation into position for marking the next plate or film to be inserted in the camera.

What I claim is:

1. A camera attachment comprising, in combination, an apertured element through which light may pass to a sensitive portion of a plate when the latter is in position within a camera, means including a projection engageable by a plate holder, upon insertion into the camera, to shift said apertured element into contact with the surface of said plate, a stencil plate having a series of identifying characters movable into registry with the aperture in said apertured element, means including a normally meshed pinion and rack for moving said stencil plate to bring an identifying character into registry with said aperture, said rack being de-meshed from said pinion by the shifting of the apertured element into contact with the surface of said plate, and means engageable with said pinion to prevent rotation of the latter pending return of the rack to the meshed position with respect to said pinion.

2. A camera attachment comprising, in combination, an apertured element through which light may pass to a sensitive portion of a plate when the latter is in position within a camera, a stencil plate having a series of identifying characters movable into registry with the aperture in said apertured element, means including normally meshed parts for moving said stencil plate to bring an identifying character into registry with said aperture, means including a projection engageable by a plate holder, upon insertion into a camera, to shift said apertured element into contact with the surface of said plate and by the same action de-mesh said normally meshed parts, and means engageable with one of said normally meshed parts to prevent movement thereof pending return of said parts to the meshed condition.

3. A camera attachment comprising, in combination, an apertured element through which light may pass to a sensitive portion of a plate when the latter is in position within a camera, a stencil plate having a series of identifying characters movable into registry with the aperture in said apertured element, means including normally meshed parts for moving said stencil plate to bring an identifying character into registry with said aperture, means including a projection engageable by a plate holder, upon insertion into a camera, to shift said apertured element into contact with the surface of said plate and by the same action de-mesh said normally meshed parts, and means engageable with one of said normally meshed parts to prevent movement thereof pending return of said parts to the meshed condition, said last-named means including a locking element, and means for moving said locking element in synchronism with the shifting of said apertured element.

4. A camera attachment comprising, in combination, an apertured element through which light may pass to a sensitive portion of a plate when the latter is in position within a camera, a stencil plate having a series of identifying characters movable into registry with the aperture in said apertured element, means including normally meshed parts for moving said stencil plate to bring an identifying character into registry with said aperture, means including a projection engageable by a plate holder, upon insertion into a camera, to shift said apertured element into contact with the surface of said plate and by the same action de-mesh said normally meshed parts, and means engageable with one of said normally meshed parts to prevent movement thereof pending return of said parts to the meshed condition, said last-named means including a locking element, and means for moving said locking element in synchronism with the shifting of said apertured element, said synchronism producing means including a cam-surfaced member integral with said plate holder operated projection, and means for operating both said apertured element and said locking element in response to the movement of said cam-surfaced member.

NECOLS CHAMPION.